US012776217B2

(12) United States Patent

Kuriyama et al.

(10) Patent No.: US 12,776,217 B2

(45) Date of Patent: Oct. 27, 2026

(54) IN-VEHICLE DEVICE, COMMUNICATION METHOD, AND COMMUNICATION PROGRAM

(71) Applicants: Sumitomo Electric Industries, Ltd., Osaka (JP); Sumitomo Wiring Systems, Ltd., Yokkaichi (JP); AutoNetworks Technologies, Ltd., Yokkaichi (JP)

(72) Inventors: Kenta Kuriyama, Osaka (JP); Akihiro Ogawa, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 31 days.

(21) Appl. No.: 18/858,616

(22) PCT Filed: Dec. 6, 2022

(86) PCT No.: PCT/JP2022/044834

§ 371 (c)(1),
(2) Date: Oct. 21, 2024

(87) PCT Pub. No.: WO2023/203809

PCT Pub. Date: Oct. 26, 2023

(65) Prior Publication Data

US 2025/0279002 A1 Sep. 4, 2025

(30) Foreign Application Priority Data

Apr. 22, 2022 (JP) ................................. 2022-070684

(51) Int. Cl.

*G08G 1/16* (2006.01)
*H04W 4/44* (2018.01)

(52) U.S. Cl.

CPC .............. *G08G 1/167* (2013.01); *H04W 4/44* (2018.02)

(58) Field of Classification Search

CPC ............ G08G 1/167; G08G 1/09; G08G 1/16; H04W 4/44

See application file for complete search history.

(56) References Cited

U.S. PATENT DOCUMENTS 4,694,295 A * 9/1987 Miller ................... G01S 17/931 340/903
5,424,952 A * 6/1995 Asayama ................ G01S 11/12 348/113

(Continued)

FOREIGN PATENT DOCUMENTS

JP 2008-217813 A 9/2008
JP 2010-079565 A 4/2010

(Continued)

OTHER PUBLICATIONS

International Search Report, Application No. PCT/JP2022/044834, mailed Feb. 28, 2023. ISA/Japan Patent Office.

*Primary Examiner* — Mussa A Shaawat

(74) *Attorney, Agent, or Firm* — Brooks Kushman P.C.

(57) ABSTRACT

An in-vehicle device includes: a communication unit configured to receive map information, which includes information on a moving object in a target area, from a management device; a detection unit configured to detect, based on the map information received by the communication unit and information indicating a detection range of an in-vehicle sensor mounted in a vehicle, a blind spot area of the in-vehicle sensor in the target area; and a communication control unit configured to control communication with the management device by the communication unit, based on a predicted content relating to movement of the moving object (Continued)

in the blind spot area detected by the detection unit and a predicted content relating to movement of the vehicle.

14 Claims, 8 Drawing Sheets

(56) References Cited

U.S. PATENT DOCUMENTS

| | | | | |
|---|---|---|---|---|
| 5,680,123 | A * | 10/1997 | Lee | G07C 5/0891 348/148 |
| 6,046,766 | A * | 4/2000 | Sakata | G08B 13/19647 348/148 |
| 6,166,764 | A * | 12/2000 | Sakata | H04N 7/183 348/148 |
| 6,476,855 | B1 * | 11/2002 | Yamamoto | H04N 7/181 348/E7.086 |
| 6,882,287 | B2 * | 4/2005 | Schofield | B60Q 9/008 348/148 |
| 8,874,267 | B1 * | 10/2014 | Dolgov | G08G 1/16 701/28 |
| 9,586,525 | B2 * | 3/2017 | Sejalon | B60Q 9/008 |
| 12,194,989 | B2 * | 1/2025 | Itoh | B60W 30/09 |
| 2010/0253918 | A1 * | 10/2010 | Seder | G08G 1/167 353/13 |
| 2014/0278047 | A1 * | 9/2014 | Bahl | G08G 1/164 701/301 |
| 2016/0355178 | A1 * | 12/2016 | Shiraishi | B60W 60/001 |
| 2019/0371178 | A1 * | 12/2019 | Fukami | G08G 1/166 |
| 2020/0180638 | A1 * | 6/2020 | Kanoh | B60W 30/095 |
| 2023/0352858 | A1 | 11/2023 | Hamaguchi et al. | |
| 2025/0206317 | A1 * | 6/2025 | Satoh | B60W 40/02 |

FOREIGN PATENT DOCUMENTS

| | | | |
|---|---|---|---|
| JP | 2017-120473 | A | 7/2017 |
| JP | 2019-215785 | A | 12/2019 |
| WO | 2021-256051 | A1 | 12/2021 |

* cited by examiner

IN-VEHICLE DEVICE, COMMUNICATION METHOD, AND COMMUNICATION PROGRAM

CROSS-REFERENCE TO RELATED APPLICATIONS

This application is the U.S. national stage of PCT/JP2022/044834 filed on Dec. 6, 2022, which claims priority of Japanese Patent Application No. JP 2022-070684 filed on Apr. 22, 2022, the contents of which are incorporated herein.

TECHNICAL FIELD

The present disclosure relates to an in-vehicle device, a communication method, and a communication program.

BACKGROUND

Conventionally, to support the safe driving of vehicles, a technology has been developed for aggregating detection results for moving objects produced by an infrastructure-based sensor and the detection results of moving objects produced by one or a plurality of in-vehicle sensors at a server and distributing information that has been generated based on the plurality of detection results to vehicles.

JP 2018-195289A discloses the in-vehicle system described below. The disclosed in-vehicle system includes: an acquisition unit that acquires, from an infrastructure system with an infrastructure sensor, first blind spot information indicating a blind spot area caused by an object from a viewpoint of an infrastructure-based sensor that detects objects in a periphery; and a detection recognition unit that generates second blind spot information indicating a blind spot area caused by the object from a viewpoint of an in-vehicle sensor that detects the objects, wherein the detection recognition unit includes an integration unit that outputs, to an external device, common blind spot information indicating a first common blind spot area that is common to the respective blind spot areas based on the first blind spot information and the second blind spot information.

There is demand for technology that can further reduce the amount of communication between an in-vehicle device and a management device located outside the vehicle beyond the technology described in JP 2018-195289A.

The present disclosure was conceived to solve the problem described above and has an object of providing an in-vehicle device, a communication method, and a communication program that can further reduce the amount of communication between an in-vehicle device and a management device outside the vehicle.

SUMMARY

An in-vehicle device according to an aspect of the present disclosure includes: a communication unit configured to receive map information, which includes information on a moving object in a target area, from a management device; a detection unit configured to detect, based on the map information received by the communication unit and information indicating a detection range of an in-vehicle sensor mounted in a vehicle, a blind spot area of the in-vehicle sensor in the target area; and a communication control unit configured to control communication with the management device by the communication unit, based on a predicted content relating to movement of the moving object in the blind spot area detected by the detection unit and a predicted content relating to movement of the vehicle.

A communication method according to an aspect of the present disclosure is a control method for an in-vehicle device and includes: a step of receiving map information, which includes information on a moving object in a target area, from a management device; a step of detecting, based on the received map information and information indicating a detection range of an in-vehicle sensor mounted in a vehicle, a blind spot area of the in-vehicle sensor in the target area; and a step of controlling communication with the management device, based on a predicted content relating to movement of the moving object in the detected blind spot area and a predicted content relating to movement of the vehicle.

A communication program according to an aspect of the present disclosure is a communication program used by an in-vehicle device and causes a computer to function as: a communication unit configured to receive map information, which includes information on a moving object in a target area, from a management device; a detection unit configured to detect, based on the map information received by the communication unit and information indicating a detection range of an in-vehicle sensor mounted in a vehicle, a blind spot area of the in-vehicle sensor in the target area; and a communication control unit configured to control communication with the management device by the communication unit, based on a predicted content relating to movement of the moving object in the blind spot area detected by the detection unit and a predicted content relating to movement of the vehicle.

Another aspect of the present disclosure can be realized not only as an in-vehicle device equipped with a characteristic processing unit like that described above, but also as a driving support system including the in-vehicle device or as a semiconductor integrated circuit that realizes the above in-vehicle device in part or in full.

Advantageous Effects

According to an aspect of the present disclosure, it is possible to reduce the amount of communication between an in-vehicle device and a management device outside the vehicle.

DETAILED DESCRIPTION OF PREFERRED EMBODIMENTS

Figure 1:
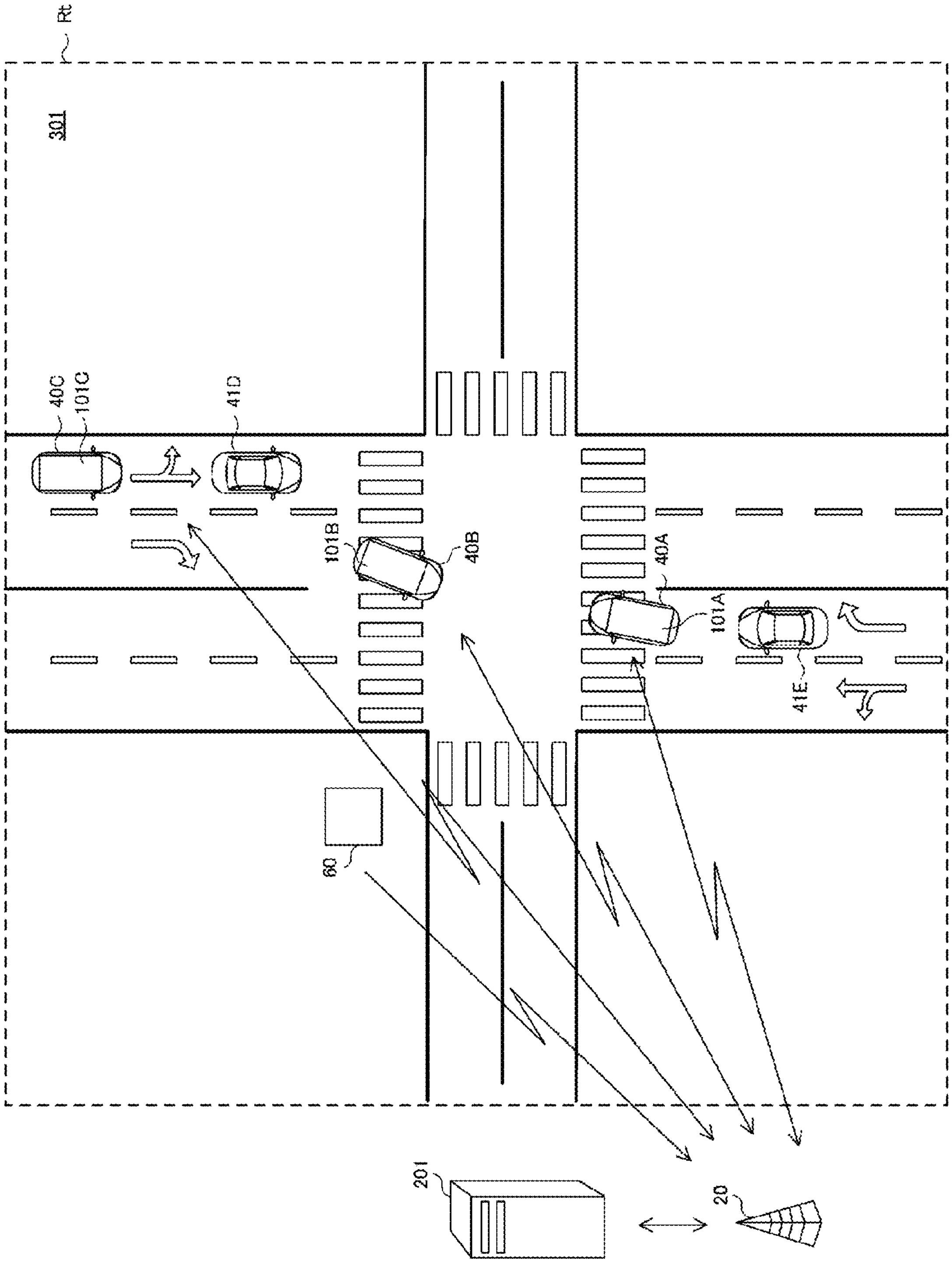
FIG. 1 is a diagram depicting the configuration of a traffic information distributing system according to an embodiment of the present disclosure.

Several embodiments of the present disclosure will first be listed and described in outline.

In a first aspect, an in-vehicle device according to an aspect of the present disclosure includes: a communication unit configured to receive map information, which includes information on a moving object in a target area, from a management device; a detection unit configured to detect, based on the map information received by the communication unit and information indicating a detection range of an in-vehicle sensor mounted in a vehicle, a blind spot area of the in-vehicle sensor in the target area; and a communication control unit configured to control communication with the management device by the communication unit, based on a predicted content relating to movement of the moving object in the blind spot area detected by the detection unit and a predicted content relating to movement of the vehicle.

In this way, by using a configuration that controls communication with the management device based on a predicted content relating to movement of the moving object in the blind spot area of the in-vehicle sensor and a predicted content relating to movement of the vehicle in which the in-vehicle sensor is mounted, it is possible to determine the need for communication with the management device based on the predicted contents and to control communication according to this determination result. Accordingly, communication with the management device can be suppressed when there is low need for communication with the management device. This means that the amount of communication between the in-vehicle device and the management device outside the vehicle can be further reduced.

In a second aspect, in the in-vehicle device according to the first aspect, the detection unit may detect a first blind spot area, which is a blind spot area of the in-vehicle sensor mounted in a host vehicle, which is the vehicle in which the in-vehicle device is mounted, the communication unit may receive blind spot information, which includes information on the moving object in the first blind spot area, from the management device, and the communication control unit may control at least one of a transmission cycle and a data amount of the blind spot information transmitted by the management device, based on a predicted content relating to movement of the moving object in the first blind spot area and a predicted content relating to movement of the host vehicle.

With this configuration, when, based on the predicted content, the possibility of a collision between a moving object in the first blind spot area and the host vehicle is low and there is low need for blind spot information at the in-vehicle device of the host vehicle, it is possible to reduce the communication amount of the blind spot information transmitted by the management device.

In a third aspect, in the in-vehicle device according to the second aspect, the communication unit may receive the blind spot information, which indicates a state of each of a plurality of grid areas produced by dividing at least part of the target area into a plurality of lattice-like grid areas and includes information on the moving object in the first blind spot area, from the management device, and the communication control unit may control a data amount of the blind spot information by controlling, based on a predicted content relating to movement of the moving object in the first blind spot area and a predicted content relating to movement of the host vehicle, a size of the grid areas in the blind spot information transmitted by the management device.

With this configuration, the data amount of the blind spot information can be controlled without changing the amount of information per grid area.

In a fourth aspect, in the in-vehicle device according to the second or the third aspects, the communication control unit may control at least one of a transmission cycle and a data amount of the blind spot information transmitted by the management device based also on the number of following vehicles within a predetermined range from a position of the host vehicle.

With this configuration, it is possible to control the communication amount of the blind spot information transmitted by the management device with consideration to whether there is any need for blind spot information for an in-vehicle device of a following vehicle that follows the host vehicle.

In a fifth aspect, in the in-vehicle device according to of the first through the fourth aspects, the detection unit may detect a second blind spot area, which is the blind spot area of the in-vehicle sensor mounted in another vehicle aside from a host vehicle, which is the vehicle in which the in-vehicle device is mounted, the communication unit may transmit detection information, which indicates a detection result of the in-vehicle sensor mounted on the host vehicle, to the management device, and the communication control unit may control at least one of a transmission cycle and a data amount of the detection information transmitted by the communication unit based on a predicted content relating to movement of the moving object in the second blind spot area and a predicted content relating to movement of the other vehicle.

With this configuration, when, according to the predicted content, there is a low possibility of a collision between a moving object in the second blind spot area and another vehicle and the in-vehicle device in this other vehicle has low need for information generated by the management device based on the detection result of an in-vehicle sensor at the host vehicle, the communication amount of the detection information transmitted from the in-vehicle device of the host vehicle to the management device can be reduced.

In a sixth aspect, in the in-vehicle device according to the fifth aspect, the communication control unit may control at least one of the transmission cycle and the data amount of the detection information transmitted by the communication unit, based also on the number of following vehicles within a predetermined range from the position of the other vehicle.

With this configuration, the communication amount of the detection information transmitted from the in-vehicle device of the host vehicle to the management device can be controlled with consideration to the need for information, which has been generated by the management device based on a detection result of the in-vehicle sensor of the host vehicle, at the in-vehicle device at other vehicles.

In a seventh aspect, a communication method according to an aspect of the present disclosure is a communication method for an in-vehicle device including: a step of receiving map information, which includes information on a moving object in a target area, from a management device; a step of detecting, based on the received map information and information indicating a detection range of an in-vehicle sensor mounted in a vehicle, a blind spot area of the in-vehicle sensor in the target area: and a step of controlling communication with the management device, based on a predicted content relating to movement of the moving object in the detected blind spot area and a predicted content relating to movement of the vehicle.

In this way, by using a method of controlling communication with a management device based on a predicted content relating to movement of the moving object in the blind spot area of the in-vehicle sensor and a predicted content relating to movement of the vehicle in which the in-vehicle device is mounted, it is possible to determine the need for communication with the management device based on the predicted contents and to control communication according to this determination result. Accordingly, communication with the management device can be suppressed when there is low need for communication with the management device. This means that the amount of communication between the in-vehicle device and the management device outside the vehicle can be further reduced.

In an eighth aspect, a communication program according to an aspect of the present disclosure is a communication program used by an in-vehicle device, the computer program causing a computer to function as: a communication unit for receiving map information, which includes information on a moving object in a target area, from a management device; a detection unit for detecting, based on the map information received by the communication unit and information indicating a detection range of an in-vehicle sensor mounted in a vehicle, a blind spot area of the in-vehicle sensor in the target area; and a communication control unit for controlling communication with the management device by the communication unit, based on a predicted content relating to movement of the moving object in the blind spot area detected by the detection unit and a predicted content relating to movement of the vehicle.

In this way, by using a configuration that controls communication with the management device based on a predicted content relating to movement of the moving object in the blind spot area of the in-vehicle sensor and a predicted content relating to movement of the vehicle in which the in-vehicle sensor is mounted, it is possible to determine the need for communication with the management device based on the predicted contents and to control communication according to this determination result. Accordingly, communication with the management device can be suppressed when there is low need for communication with the management device. This means that the amount of communication between the in-vehicle device and the management device outside the vehicle can be further reduced.

Preferred embodiments of the present disclosure will now be described with reference to the drawings. Note that identical and corresponding parts in the drawings have been assigned the same reference numerals, and description thereof will not be repeated. The embodiments described below may also be freely combined, at least in part.

Configuration and Basic Operation

FIG. 1 is a diagram depicting the configuration of a traffic information distributing system according to an embodiment of the present disclosure. As depicted in FIG. 1, a traffic information distributing system 301 includes in-vehicle devices 101A, 101B, and 101C, a distribution server 201, and a roadside device 60. The distribution server 201 is one example of a "management device" for the present invention. Hereinafter, the in-vehicle devices 101A, 101B, and 101C will also be referred to as the "in-vehicle devices 101". The traffic information distributing system 301 may include a plurality of roadside devices 60, and may include one, two, or four or more in-vehicle devices 101.

In the example depicted in FIG. 1, vehicles 40A, 40B, 40C, 41D, and 41E are present in a target area Rt that includes an intersection. As one example, the target area Rt is an area of 400 meters square with the intersection at its center.

The in-vehicle device 101A is mounted in the vehicle 40A, the in-vehicle device 101B is mounted in the vehicle 40B, and the in-vehicle device 101C is mounted in the vehicle 40C. It is assumed that no in-vehicle devices 101 are mounted in the vehicles 41D and 41E. Hereinafter, each of the vehicles 40A, 40B, and 40C will also be referred to as "the vehicle 40", and each of the vehicles 41D and 41E will also be referred to as "the vehicle 41".

Each roadside device 60 is installed at an intersection, for example. The roadside device 60 can communicate with the distribution server 201 via a wireless base station 20 using ITS (Intelligent Transport System) wireless communication, for example.

Each roadside device 60 detects surrounding objects regularly or irregularly using sensors such as a camera, LiDAR (Light Detection and Ranging), and a millimeter-wave radar device and transmits detection information D1 indicating the detection results via the wireless base station 20 to the distribution server 201. The "objects" referred to here are structures, vehicles 40, people, and the like. As one example, the detection information D1 includes the type, position, speed, and movement direction of each detected object.

Figure 2:
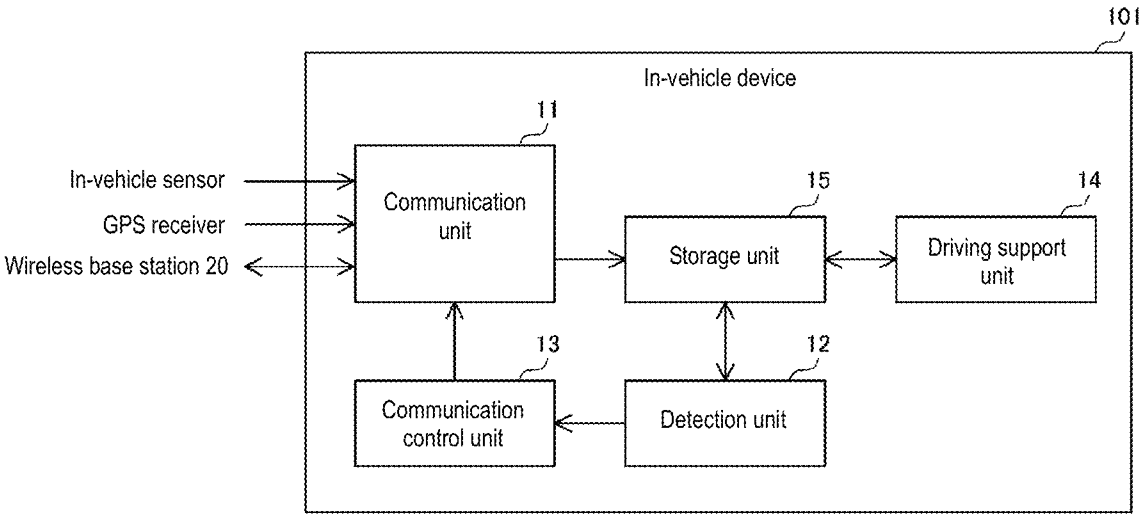
FIG. 2 depicts the configuration of an in-vehicle device according to an embodiment of the present disclosure.

FIG. 2 depicts the configuration of an in-vehicle device according to an embodiment of the present disclosure. As depicted in FIG. 2, the in-vehicle device 101 includes a communication unit 11, a detection unit 12, a communication control unit 13, a driving support unit 14, and a storage unit 15. Some or all of the communication unit 11, the detection unit 12, the communication control unit 13, and the driving support unit 14 are realized, for example, by a processing circuit (or "circuitry") including one or a plurality of processors. As one example, the storage unit 15 is a nonvolatile memory included in the processing circuit mentioned above.

Each vehicle 40 is equipped with an in-vehicle sensor, such as a camera, LiDAR, and a millimeter-wave radar device, as well as a GPS (Global Positioning System) receiver. The in-vehicle sensor detects objects within a predetermined detection range in the periphery of the vehicle 40 and outputs the detection results to the communication unit 11. The GPS receiver acquires position information of the vehicle 40 and outputs the position information to the communication unit 11.

The storage unit 15 stores sensor information indicating the detection range of the in-vehicle sensor mounted in the vehicle 40.

The communication unit 11 transmits, to the distribution server 201, detection information D2 indicating the detection results of the in-vehicle sensor mounted in the vehicle 40 in which the in-vehicle device 101 is mounted.

As one example, the communication unit 11 receives location information from a GPS receiver and confirms the current location of the vehicle 40. While the vehicle 40 is located in the target area Rt, the communication unit 11 transmits K-bit detection information D2 including the detection results of the in-vehicle sensor, the location information, and an ID of the in-vehicle device 101 via the wireless base station 20 to the distribution server 201 at timing in keeping with a transmission cycle Cs of a predetermined length. Here, K is a positive integer. A length Ts1 of the transmission cycle Cs is 0.1 seconds, for example.

Figure 3:
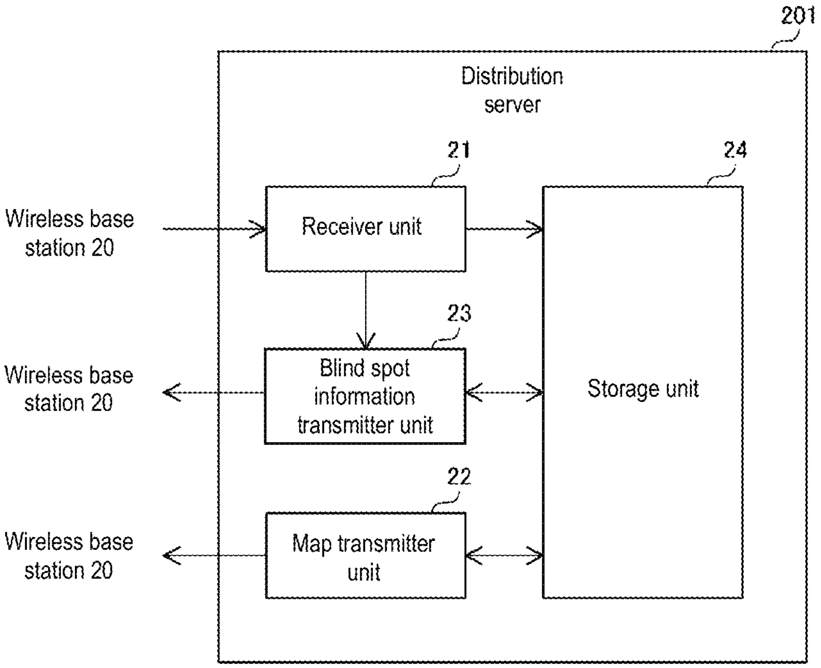
FIG. 3 is a diagram depicting the configuration of a distribution server according to an embodiment of the present disclosure.

FIG. 3 is a diagram depicting the configuration of a distribution server according to an embodiment of the present disclosure. As depicted in FIG. 3, the distribution server 201 includes a receiver unit 21, a map transmitter unit 22, a blind spot information transmitter unit 23, and a storage unit 24. Some or all of the receiver unit 21, the map transmitter unit 22, and the blind spot information transmitter unit 23 are realized by a processing circuit (or "circuitry") including one or a plurality of processors. As one example, the storage unit 24 is a nonvolatile memory included in the processing circuit mentioned above.

The storage unit 24 stores sensor information indicating the detection ranges of the in-vehicle sensors mounted in the vehicles 40. The storage unit 24 also stores road map data of the target area Rt.

The receiver unit 21 receives the detection information D1 from the roadside device 60 via the wireless base station 20 and stores the received detection information D1 in the storage unit 24. The receiver unit 21 also receives detection information D2 via the wireless base station 20 from the in-vehicle device 101 and stores the received detection information D2 in the storage unit 24.

The map transmitter unit 22 generates map information including information on moving objects in the target area Rt. In more detail, the map transmitter unit 22 acquires the detection information D1 and D2 and the road map data from the storage unit 24, and generates map information that is an overhead map of the target area Rt by reproducing moving objects such as the vehicles 40 and 41 and pedestrians indicated by the detection information D1 and D2 in a virtual space indicated by the road map data. This map information includes the type, position, speed, and movement direction of each moving object that was detected.

The map transmitter unit 22 generates map information at timing according to a transmission cycle Cm of a predetermined length, and transmits the generated map information via the wireless base station 20 to the in-vehicle devices 101 positioned in the target area Rt. In addition, the map transmitter unit 22 stores the generated map information in the storage unit 24.

As one example, the blind spot information transmitter unit 23 generates blind spot information including information on moving objects in a blind spot area of an in-vehicle sensor mounted on a vehicle 40. The blind spot information transmitter unit 23 generates blind spot information that indicates a state of each grid area for a case where at least part of the target area Rt has been divided into grid areas of X meters square and that includes information on moving objects in the blind spot area of the in-vehicle sensor. As one example, X is 2.

Here, the "state" of a grid area can include, as examples, an "unknown state" in which no detection result can be obtained for reasons such as the grid area being outside the detection ranges of the in-vehicle sensor and the roadside device 60 or map data not existing, an "object present state" where a moving or stationary object is present, a "blind spot state" in which the grid area is in a blind spot of the in-vehicle sensor mounted on the vehicle 40, and a "clear state" where no object is present in the grid area.

In more detail, the blind spot information transmitter unit 23 acquires the detection information D1 and D2, the road map data, and the sensor information from the storage unit 24. For each vehicle 40 present in the target area Rt, the blind spot information transmitter unit 23 identifies, based on the detection information D2 including the ID of the vehicle 40 in question and the road map data, an area within the target area Rt that is in front of the vehicle 40 and corresponds to an oncoming lane with respect to the lane in which the vehicle 40 is located. Based on the detection information D1 and D2 and the sensor information, the blind spot information transmitter unit 23 determines, for each vehicle 40 present in the target area Rt, a blind spot area of the in-vehicle sensor mounted on that vehicle 40 within the identified area and generates blind spot information based on this determination result.

The blind spot information transmitter unit 23 generates blind spot information at generation timing in keeping with a transmission cycle Cb of a predetermined length and transmits the generated blind spot information via the wireless base station 20 to the in-vehicle device 101 of the corresponding vehicle 40. As one example, the transmission cycle Cb of the blind spot information transmitted by the blind spot information transmitter unit 23 is shorter than the transmission cycle Cm of the map information transmitted by the map transmitter unit 22. A length Tb1 of the transmission cycle Cb is 0.1 seconds, for example.

Referring back to FIG. 2, the communication unit 11 in the in-vehicle device 101 of the vehicle 40 located in the target area Rt receives the map information via the wireless base station 20 from the distribution server 201 and stores the received map information in the storage unit 15. The communication unit 11 also receives the blind spot information via the wireless base station 20 from the distribution server 201 and stores the received blind spot information in the storage unit 15.

The driving support unit 14 in the in-vehicle device 101 provides driving support for the vehicle 40 based on the blind spot information stored in the storage unit 15 by the communication unit 11. In more detail, as the driving support, the driving support unit 14 performs control to display the course of the vehicle on the screen of a car navigation system and/or performs automatic driving by controlling the running of the vehicle 40, such as the speed.

Problem

In the traffic information distributing system 301, there is demand for a technology that can further reduce the amount of communication between the in-vehicle devices 101 and the distribution server 201.

In more detail, if the in-vehicle device 101 of every vehicle 40 inside the target area Rt regularly transmits the detection information D2 to the distribution server 201 and the distribution server 201 regularly transmits blind spot information to the in-vehicle device 101 of every vehicle 40 inside the target area Rt, the amount of communication between the in-vehicle devices 101 and the distribution server 201 and the communication cost, in the form of network resources and the like, will increase.

For this reason, the in-vehicle device 101 according to an embodiment of the present disclosure uses the following configuration to solves this problem.

Communication Control

The detection unit 12 detects a blind spot area of an in-vehicle sensor mounted on the vehicle 40 in the target area Rt based on the map information received by the communication unit 11 and information indicating the detection range of the in-vehicle sensor.

The communication control unit 13 controls communication with the distribution server 201 by the communication unit 11 based on a predicted content relating to the movement of moving objects in the blind spot area detected by the detection unit 12 and a predicted content relating to movement of the vehicle 40 in which the in-vehicle sensor is mounted.

Control Example 1

The detection unit 12 detects a blind spot area R1 of an in-vehicle sensor mounted on the vehicle 40 in which the in-vehicle device 101 including the detection unit 12 is mounted. This blind spot area R1 is one example of a "first blind spot area" for the present invention.

Figure 4:
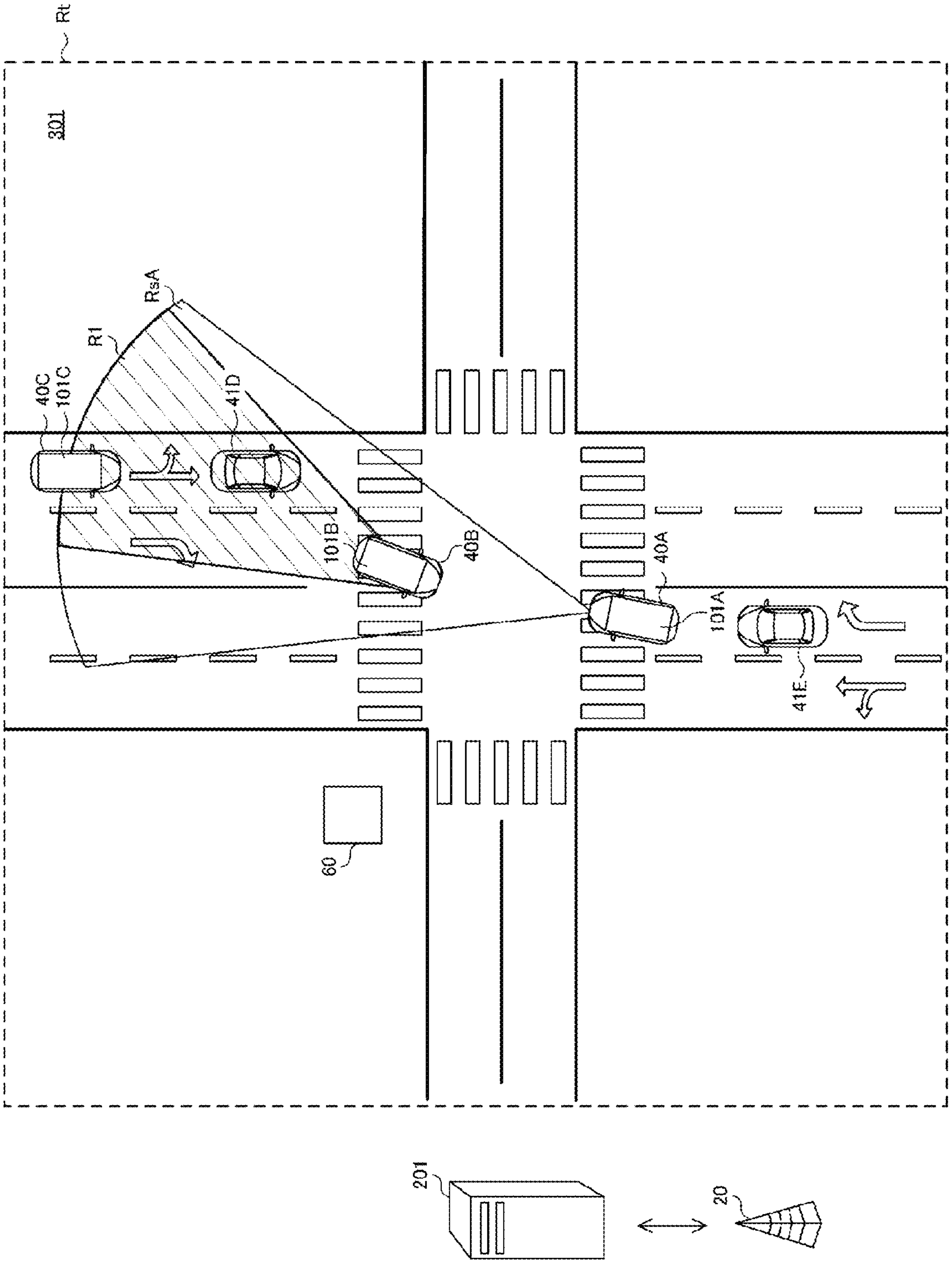
FIG. 4 depicts a first example of detection of a blind spot area by a detection unit in an in-vehicle device according to an embodiment of the present disclosure.

FIG. 4 depicts a first example of detection of a blind spot area by a detection unit in an in-vehicle device according to an embodiment of the present disclosure.

As depicted in FIG. 4, when map information has been stored in the storage unit 15 by the communication unit 11, the detection unit 12 of the in-vehicle device 101A detects, based on the map information and sensor information in the storage unit 15, the blind spot area R1 of the in-vehicle sensor mounted on the vehicle 40A out of a detection range RsA indicated by the sensor information. In the example depicted in FIG. 4, the blind spot area R1 occurs due to the presence of the vehicle 40B.

The detection unit 12 generates blind spot detection information indicating the detected blind spot area R1 and outputs blind spot detection information to the communication control unit 13.

The communication control unit 13 in the in-vehicle device 101A controls the transmission cycle Cb and a data amount of the blind spot information to be transmitted by the distribution server 201 based on a predicted content relating to the movement of moving objects in the blind spot area R1 and a predicted content relating to the movement of the vehicle 40A. As one example, the communication control unit 13 controls the data amount of the blind spot area by controlling the size of the grid areas in the blind spot information to be transmitted by the distribution server 201.

In more detail, the communication control unit 13 acquires illumination control information for controlling an illumination state, for example, the illuminated color, of a traffic light (not illustrated) at an intersection from an illumination control device (not illustrated). The communication control unit 13 predicts the movement trajectories of the vehicles 40C and 41D, which are moving objects in the blind spot area R1, based on the acquired illumination control information, the blind spot detection information received from the detection unit 12, and the map information in the storage unit 15. In addition, the communication control unit 13 predicts the movement trajectory of the vehicle 40A based on the illumination control information as well as a planned route, driving history, and the like of the vehicle 40A.

The communication control unit 13 determines the possibility of the vehicle 40A colliding with the vehicles 40C and 41D based on the predicted results of the movement trajectory of the vehicle 40A and the predicted results of the movement trajectories of the vehicles 40C and 41D, and based on this determination result, controls the transmission cycle Cb and the data amount of the blind spot information to be transmitted by the distribution server 201.

In more detail, if the communication control unit 13 has predicted, based on the predicted result of the movement trajectory of the vehicle 40A and the predicted result of the movement trajectory of the vehicle 40C, that the vehicle 40A and the vehicle 40C will pass through the same area of a predetermined size within a predetermined length of time, the communication control unit 13 determines that there is a possibility of the vehicle 40A colliding with the vehicle 40C. Likewise, if the communication control unit 13 has predicted, based on the predicted result of the movement trajectory of the vehicle 40A and the predicted result of the movement trajectory of the vehicle 41D, that the vehicle 40A and the vehicle 41D will pass through the same area of a predetermined size within a predetermined length of time, the communication control unit 13 determines that there is a possibility of the vehicle 40A colliding with the vehicle 41D.

When the communication control unit 13 has determined that there is no possibility of the vehicle 40A colliding with the vehicles 40C and 41D, the communication control unit 13 generates control information A1 including the ID of the in-vehicle device 101A in order to reduce the amount of data on the blind spot area by lengthening the transmission cycle Cb of the blind spot information by the distribution server 201 and increasing the size of the grid areas in the blind spot information transmitted by the distribution server 201, and outputs this generated control information A1 to the communication unit 11.

When the communication unit 11 has received this control information A1 from the communication control unit 13, the communication unit 11 transmits the received control information A1 via the wireless base station 20 to the distribution server 201.

Referring back to FIG. 3, the receiver unit 21 in the distribution server 201 receives the control information A1 via the wireless base station 20 from the in-vehicle device 101A and outputs the received control information A1 to the blind spot information transmitter unit 23.

The blind spot information transmitter unit 23 receives the control information A1 from the receiver unit 21 and changes, in accordance with the received control information A1, the length Tb1 of the current transmission cycle Cb of the blind spot information to the in-vehicle device 101A to a length Tb2 that is longer than the length Tb1. In addition, in accordance with the control information A1, the blind spot information transmitter unit 23 changes the size of the grid areas in the blind spot information to be generated to Y meters square, which is larger than X meters square, to reduce the number of grid areas and thereby reduce the data amount of the blind spot information to be transmitted to the in-vehicle device 101A.

Referring again to FIG. 2, as one example, the communication control unit 13 in the in-vehicle device 101A controls the transmission cycle Cb and the data amount of the blind spot information to be transmitted by the distribution server 201 based also on the number of following vehicles within a predetermined range from the position of the vehicle 40A. Here, the expression "following vehicle" for the vehicle 40 refers to the vehicles 40 and 41 located behind the vehicle 40 in the same lane or a different lane in the same travelling direction on the road on which the vehicle 40 is located.

In more detail, the communication control unit 13 determines, based on the map information in the storage unit 15, whether there is one or more following vehicles within a predetermined range from the position of the vehicle 40A.

When the communication control unit 13 has determined that there is no possibility of the vehicle 40A colliding with the vehicles 40C and 41D and that there is no following vehicle within a predetermined range from the position of the vehicle 40A, the communication control unit 13 generates control information A2 including an ID of the in-vehicle device 101A, for reducing the amount of data on the blind spot area by lengthening the transmission cycle Cb of the blind spot information to be transmitted by the distribution server 201 and increasing the size of the grid areas in the blind spot information transmitted by the distribution server 201, and outputs the generated control information A2 to the communication unit 11.

On the other hand, if the communication control unit 13 has determined that there is no possibility of the vehicle 40A colliding with the vehicles 40C and 41D but has determined that the vehicle 41E is present as a following vehicle within a predetermined range from the position of the vehicle 40A, the communication control unit 13 generates the control information A1 as described earlier and outputs the control information A1 to the communication unit 11.

When the communication unit 11 has received the control information A2 from the communication control unit 13, the communication unit 11 transmits the received control information A2 via the wireless base station 20 to the distribution server 201.

Referring back to FIG. 3, the receiver unit 21 in the distribution server 201 receives the control information A2 via the wireless base station 20 from the in-vehicle device 101A and outputs the received control information A2 to the blind spot information transmitter unit 23.

The blind spot information transmitter unit 23 receives the control information A2 from the receiver unit 21 and changes, in accordance with the received control information A2, the length Tb1 of the current transmission cycle Cb of the blind spot information to the in-vehicle device 101A to a length Tb3 that is longer than the lengths Tb1 and Tb2. In accordance with the control information A2, the blind spot information transmitter unit 23 reduces the data amount of the blind spot information to be transmitted to the in-vehicle device 101A by changing the size of the grid areas in the generated blind spot information to Z meters square, which is larger than X meters square, to reduce the number of grid areas. It is assumed here that Z meters is larger than Y meters.

Referring again to FIG. 2, if the communication control unit 13 has determined that there is a possibility of the vehicle 40A colliding with at least one of the vehicles 40C and 41D, the communication control unit 13 does not generate or output the control information A1 and A2 to the communication unit 11. As one example, if, after generating the control information A1 or A2 and outputting to the communication unit 11 to change the transmission cycle Cb and the data amount of the blind spot information to be transmitted by the distribution server 201, the communication control unit 13 then receives blind spot detection information from the detection unit 12 and determines that there is a possibility of the vehicle 40A colliding with at least one of the vehicles 40C and 41D, the communication control unit 13 generates control information A3 for returning the transmission cycle Cb and the data amount of the blind spot information to be transmitted by the distribution server 201 to the original values, and outputs the generated control information A3 to the communication unit 11.

When the control information A3 has been received from the communication control unit 13, the communication unit 11 transmits the received control information A3 via the wireless base station 20 to the distribution server 201.

Referring back to FIG. 3, the receiver unit 21 at the distribution server 201 receives the control information A3 via the wireless base station 20 from the in-vehicle device 101A and outputs the received control information A3 to the blind spot information transmitter unit 23.

The blind spot information transmitter unit 23 receives the control information A3 from the receiver unit 21 and, in accordance with the received control information A3, returns the length of the current transmission cycle Cb of the blind spot information to the in-vehicle device 101A to the length Tb1. Also in accordance with the control information A3, the blind spot information transmitter unit 23 returns the size of the grid areas in the blind spot information to be generated to X meters square.

Note that the blind spot information transmitter unit 23 may be configured to stop generating the blind spot information instead of changing the transmission cycle Cb of the blind spot information and changing the size of the grid areas in the blind spot information. By doing so, it is possible to further reduce the amount of communication between the in-vehicle device 101A and the distribution server 201.

In addition, the blind spot information transmitter unit 23 may be configured to acquire illumination control information from an illumination control device (not illustrated), and change the transmission cycle Cb of the blind spot information and the size of the grid areas in the blind spot information, or alternatively stop generating the blind spot information, in keeping with the illuminated color of a traffic signal indicated by the acquired illumination control information. As one example, the blind spot information transmitter unit 23 stops generating the blind spot information during a period when the illuminated color of a traffic signal indicated by the illumination control information is red and the vehicle 40 has stopped in front of the traffic signal in question without entering an intersection.

As one example, assume that there is a 50% probability of a blind spot area R1 occurring for the oncoming lane of the lane in which the vehicle 40A is located, a 50% probability that the signal light is red when the in-vehicle device 101A reaches an intersection and the in-vehicle device 101A stops in front of the traffic signal, and a 25% probability that the vehicle 40A is the leading vehicle in the lane in which it is travelling. In this case, when the blind spot information transmitter unit 23 receives, for example, the control information A1 and stops generating the blind spot information in keeping with the control information A1 and the illuminated color indicated by the received illumination control information, the average amount of communication between the in-vehicle device 101A and the distribution server 201 can be reduced to $(50/100)\times(50/100)\times(25/100)=1/16$.

Control Example 2

The detection unit 12 detects a blind spot area R2 of an in-vehicle sensor mounted on a vehicle 40 that differs from the vehicle 40 in which the in-vehicle device 101 including this detection unit 12 is mounted. This blind spot area R2 is one example of a "second blind spot area" for the present invention.

Figure 5:
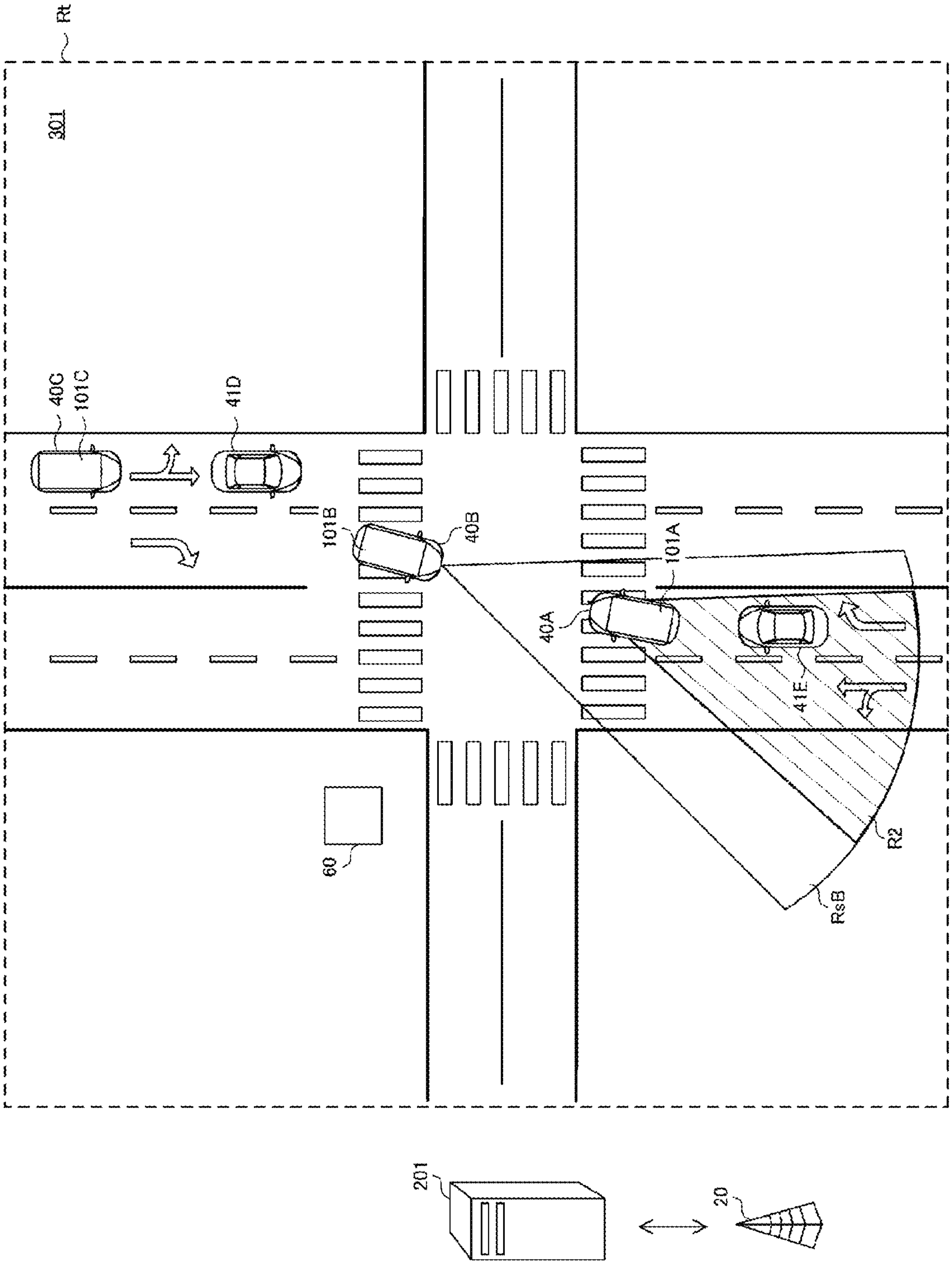
FIG. 5 depicts a second example of detection of a blind spot area by a detection unit in the in-vehicle device according to an embodiment of the present disclosure.

FIG. 5 depicts a second example of detection of a blind spot area by a detection unit in the in-vehicle device according to an embodiment of the present disclosure.

Referring to FIG. 5, when map information is stored in the storage unit 15 by the communication unit 11, the detection unit 12 in the in-vehicle device 101A detects the blind spot area R2 within a detection range RsB of an in-vehicle sensor mounted on the vehicle 40B based on the map information in the storage unit 15. In the example depicted in FIG. 5, the blind spot area R2 occurs due to the presence of the vehicle 40A. The detection unit 12 may receive sensor information indicating the detection range RsB from the distribution server 201 via the wireless base station 20 and the communication unit 11 and detect the blind spot area R2 based on the received sensor information, or may assume that the detection range RsB is the same as the detection range RsA and detect the blind spot area R2 based on the sensor information in the storage unit 15.

The detection unit 12 generates blind spot detection information indicating the detected blind spot area R2 and outputs the blind spot detection information to the communication control unit 13.

The communication control unit 13 in the in-vehicle device 101A controls the transmission cycle Cs and the data amount of the detection information D2 to be transmitted by the communication unit 11 based on a predicted content relating to the movement of moving objects in the blind spot area R2 and a predicted content relating to the movement of the vehicle 40B.

In more detail, the communication control unit 13 predicts a movement trajectory of the vehicle 41E, which is a moving object in the blind spot area R2, based on the illumination control information, the blind spot detection information received from the detection unit 12, and the map information in the storage unit 15. The communication control unit 13 also predicts the movement trajectory of the vehicle 40B based on the illumination control information and the map information.

The communication control unit 13 determines the possibility of a collision between the vehicle 40B and the vehicle 41E based on the predicted result of the movement trajectory of the vehicle 40B and the predicted result of the movement trajectory of the vehicle 41E and controls the transmission cycle Cs and the data amount of the detection information D2 to be transmitted by the communication unit 11 based on this determination result.

In more detail, when the communication control unit 13 has predicted, based on the predicted result of the movement trajectory of the vehicle 40B and the predicted result of the movement trajectory of the vehicle 41E, that the vehicle 40B and the vehicle 41E will pass through the same area of a predetermined size within a predetermined length of time, the communication control unit 13 determines that there is a possibility of the vehicle 40B colliding with the vehicle 41E.

When the communication control unit 13 has determined that there is no possibility of the vehicle 40B colliding with the vehicle 41E, the communication control unit 13 generates the control information B1 to lengthen the transmission cycle Cs of the detection information D2 transmitted by the communication unit 11 and reduce the data amount of the detection information D2 to be transmitted by the communication unit 11 and outputs the generated control information B1 to the communication unit 11.

When the control information B1 has been received from the communication control unit 13, the communication unit 11 changes, in accordance with the received control information B1, the length Ts1 of the current transmission cycle Cs of the detection information D2 to the distribution server 201 to a length Ts2 that is longer than the length Ts1. In accordance with the control information B1, the communication unit 11 also changes the data amount of the detection information D2 to be generated to L bits, which is fewer than K bits. Here, L is a positive integer.

As one example, the communication control unit 13 in the in-vehicle device 101A controls the transmission cycle Cs and the data amount of the detection information D2 to be transmitted by the communication unit 11 based also on the number of following vehicles within a predetermined range from the position of the vehicle 40B.

In more detail, the communication control unit 13 determines, based on the map information in the storage unit 15, whether there is one or more following vehicles within a predetermined range from the position of the vehicle 40B.

When the communication control unit 13 has determined that there is no possibility of the vehicle 40B colliding with the vehicle 41E and that there are no following vehicles within a predetermined range of the position of the vehicle 40B, the communication control unit 13 generates the control information B2 for lengthening the transmission cycle Cs of the detection information D2 transmitted by the communication unit 11 and reducing the data amount of the detection information D2 transmitted by the communication unit 11, and outputs the generated control information B2 to the communication unit 11.

On the other hand, if the communication control unit 13 has determined that there is no possibility of the vehicle 40B colliding with the vehicle 41E and that the vehicles 40C and 41D are present as following vehicles within the predetermined range from the position of the vehicle 40B, the communication control unit 13 generates the control information B1 as described earlier and outputs the control information B1 to the communication unit 11.

When the control information B2 has been received from the communication control unit 13, the communication unit 11 changes, in accordance with the received control information B2, the length Ts1 of the current transmission cycle Cs of the detection information D2 transmitted to the distribution server 201 to a length Ts3 that is longer than the lengths Ts1 and Ts2. The communication unit 11 also changes, in accordance with the control information B2, the data amount of the detection information D2 to be generated to M bits, which is fewer than K bits. It is assumed here that M bits is fewer than L bits. M is a positive integer.

When the communication control unit 13 has determined that there is the possibility of the vehicle 40B colliding with the vehicle 41E, the communication control unit 13 does not generate the control information B1 or B2 and does not output the control information B1 or B2 to the communication unit 11. As one example, if, after generating the control information B1 or B2 and outputting the control information B1 or B2 to the communication unit 11 to change the transmission cycle Cs and the data amount of the detection information D2 transmitted by the communication unit 11, the communication control unit 13 has received the blind spot detection information from the detection unit 12 and determined that there is the possibility of the vehicle 40B colliding with the vehicle 40E, the communication control unit 13 generates control information B3 for returning the transmission cycle CS and the data amount of the detection information D2 transmitted by the communication unit 11 to the original values and outputs the generated control information B3 to the communication unit 11.

When the control information B3 has been received from the communication control unit 13, the communication unit 11 returns the length of the current transmission cycle Cs of the detection information D2 transmitted to the distribution server 201 to the length Ts1 in accordance with the received control information B3. The communication unit 11 also returns the data amount of the detection information D2 to be generated to K bits in accordance with the control information B3.

Operation Flow

Figure 6:
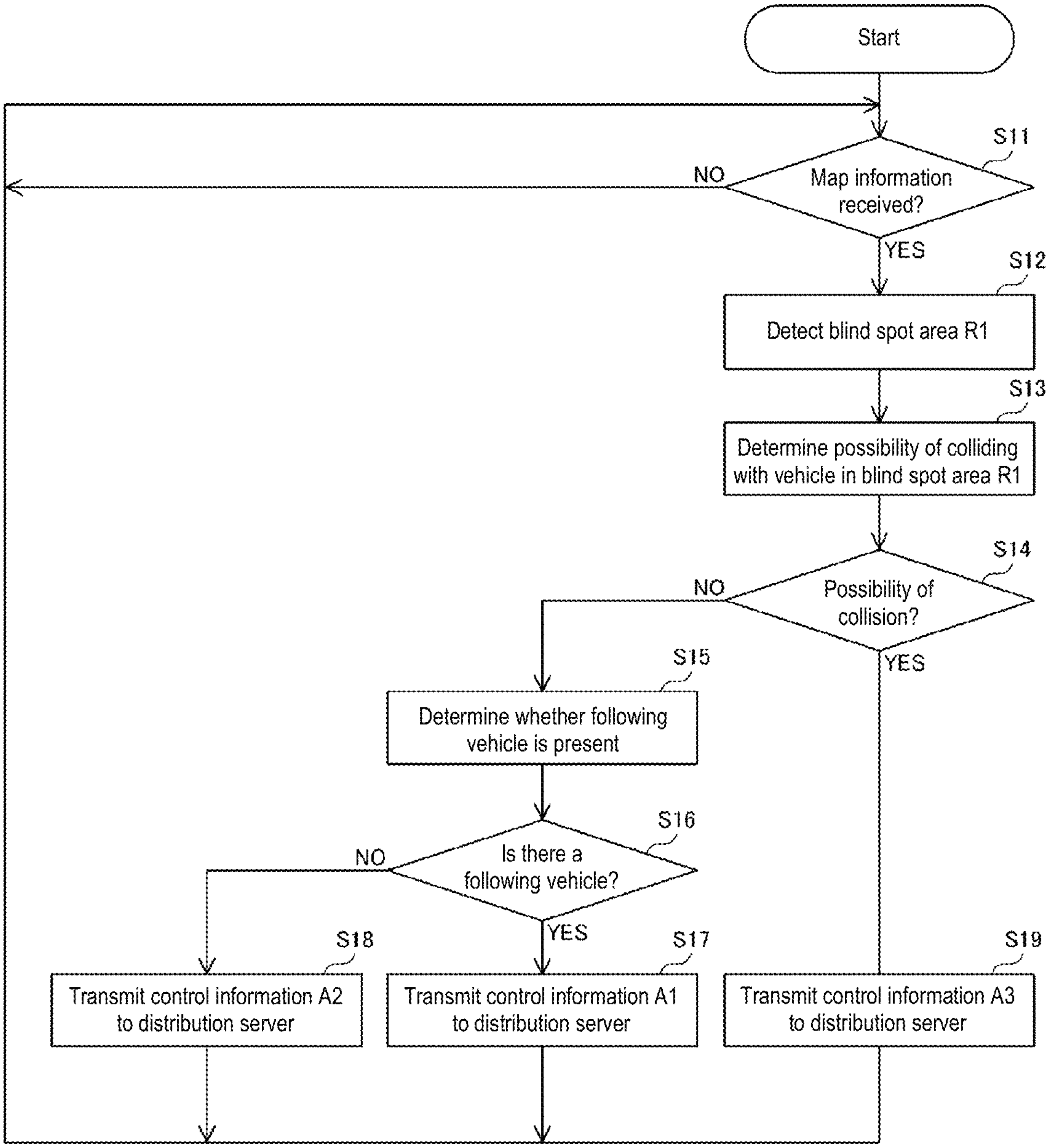
FIG. 6 is a flowchart defining one example of an operation procedure when an in-vehicle device according to an embodiment of the present disclosure performs communication control.

FIG. 6 is a flowchart defining one example of an operation procedure when an in-vehicle device according to an embodiment of the present disclosure performs communication control. FIG. 6 is a flowchart for when control example 1 described earlier is performed.

As depicted in FIG. 6, first, the in-vehicle device 101A stands by until the arrival of map information ("NO" in step S11) and when the in-vehicle device 101A has received the map information via the wireless base station 20 from the distribution server 201 ("YES" in step S11), the in-vehicle device 101A detects the blind spot area R1 of the in-vehicle sensor mounted in the vehicle 40A based on the map information and the sensor information (step S12).

Next, the in-vehicle device 101A predicts the movement trajectories of the vehicles 40C and 41D in the blind spot area R1 and the movement trajectory of the vehicle 40A, and determines, based on the prediction results, whether there is a possibility of the vehicle 40A colliding with the vehicles 40C and 41D (step S13).

After this, if the in-vehicle device 101A has determined that there is no possibility of the vehicle 40A colliding with the vehicles 40C and 41D ("NO" in step S14), the in-vehicle device 101A then determines, based on the map information, whether there is a following vehicle within a predetermined range from the position of the vehicle 40A (step S15).

Next, if the in-vehicle device 101A has determined that there is a following vehicle within a predetermined range from the position of the vehicle 40A ("YES" in step S16), the in-vehicle device 101A generates the control information A1 and transmits the generated control information A1 via the wireless base station 20 to the distribution server 201 (step S17).

After this, the in-vehicle device 101A stands by until the arrival of new map information ("NO" in step S11).

On the other hand, if the in-vehicle device 101A has determined that there are no following vehicles within the predetermined range from the position of the vehicle 40A ("NO" in step S16), the in-vehicle device 101A generates the control information A2 and transmits the generated control information A2 via the wireless base station 20 to the distribution server 201 (step S18).

Next, the in-vehicle device 101A stands by until the arrival of new map information ("NO" in step S11).

On the other hand, if after transmitting as examples the control information A1 or the control information A2 via the wireless base station 20 to the distribution server 201, the in-vehicle device 101A has determined that there is a possibility of the vehicle 40A colliding with at least one of the vehicles 40C and 41D ("YES" in step S14), the in-vehicle device 101A generates control information A3 and transmits the generated control information A3 via the wireless base station 20 to the distribution server 201 (step S19).

After this, the in-vehicle device 101A stands by until the arrival of new map information ("NO" in step S11).

Figure 7:
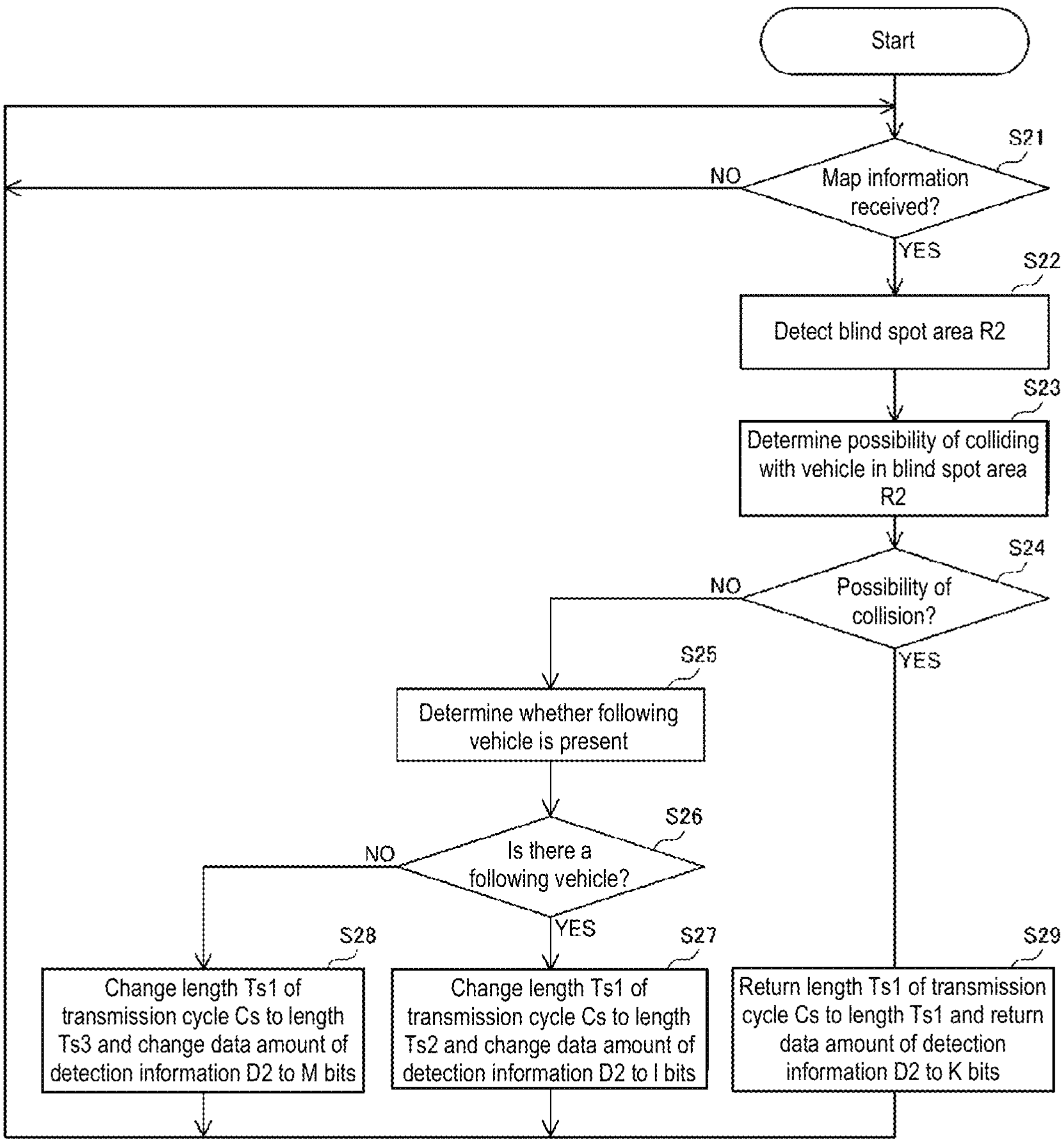
FIG. 7 is a flowchart defining another example of an operation procedure when an in-vehicle device according to an embodiment of the present disclosure performs communication control.

FIG. 7 is a flowchart defining another example of an operation procedure when an in-vehicle device according to an embodiment of the present disclosure performs communication control. FIG. 7 is a flowchart for when control example 2 described earlier is performed.

As depicted in FIG. 7, first, the in-vehicle device 101A stands by until the arrival of map information ("NO" in step S21), and when the in-vehicle device 101A has received the map information via the wireless base station 20 from the distribution server 201 ("YES" in step S21), the in-vehicle device 101A detects the blind spot area R2 of the in-vehicle sensor mounted on the vehicle 40B based on the map information (step S22).

Next, the in-vehicle device 101A predicts the movement trajectory of the vehicle 41E in the blind spot area R2 and the movement trajectory of the vehicle 40B and determines, based on the prediction results, whether there is a possibility of the vehicle 40B colliding with the vehicle 41E (step S23).

After this, if the in-vehicle device 101A has determined that there is no possibility of the vehicle 40B colliding with the vehicle 41E ("NO" in step S24), the in-vehicle device 101A then determines, based on the map information, whether there is a following vehicle within a predetermined range from the position of the vehicle 40B (step S25).

Next, if the in-vehicle device 101A has determined that there is a following vehicle within a predetermined range from the position of the vehicle 40B ("YES" in step S26), the in-vehicle device 101A changes the length Ts1 of the transmission cycle Cs of the detection information D2 to the length Ts2 and changes the data amount of the detection information D2 to be generated to L bits (step S27).

After this, the in-vehicle device 101A stands by until the arrival of new map information ("NO" in step S21).

On the other hand, if the in-vehicle device 101A has determined that there are no following vehicles within a predetermined range from the position of the vehicle 40B ("NO" in step S26), the in-vehicle device 101A changes the length Ts1 of the transmission cycle Cs of the detection information D2 to a length Ts3 and changes the data amount of the detection information D2 to be generated to M bits (step S28).

Next, the in-vehicle device 101A stands by until the arrival of new map information ("NO" in step S21).

On the other hand, if after changing the transmission cycle Cs and the data amount of the detection information D2 for example, the in-vehicle device 101A determines that there is the possibility of the vehicle 40B colliding with the vehicle 41E ("YES" in step S24), the in-vehicle device 101A returns the length of the transmission cycle Cs to the length Ts1 and the data amount of the detection information D2 to be generated to K bits (step S29).

After this, the in-vehicle device 101A stands by until the arrival of new map information ("NO" in step S21).

Figure 8:
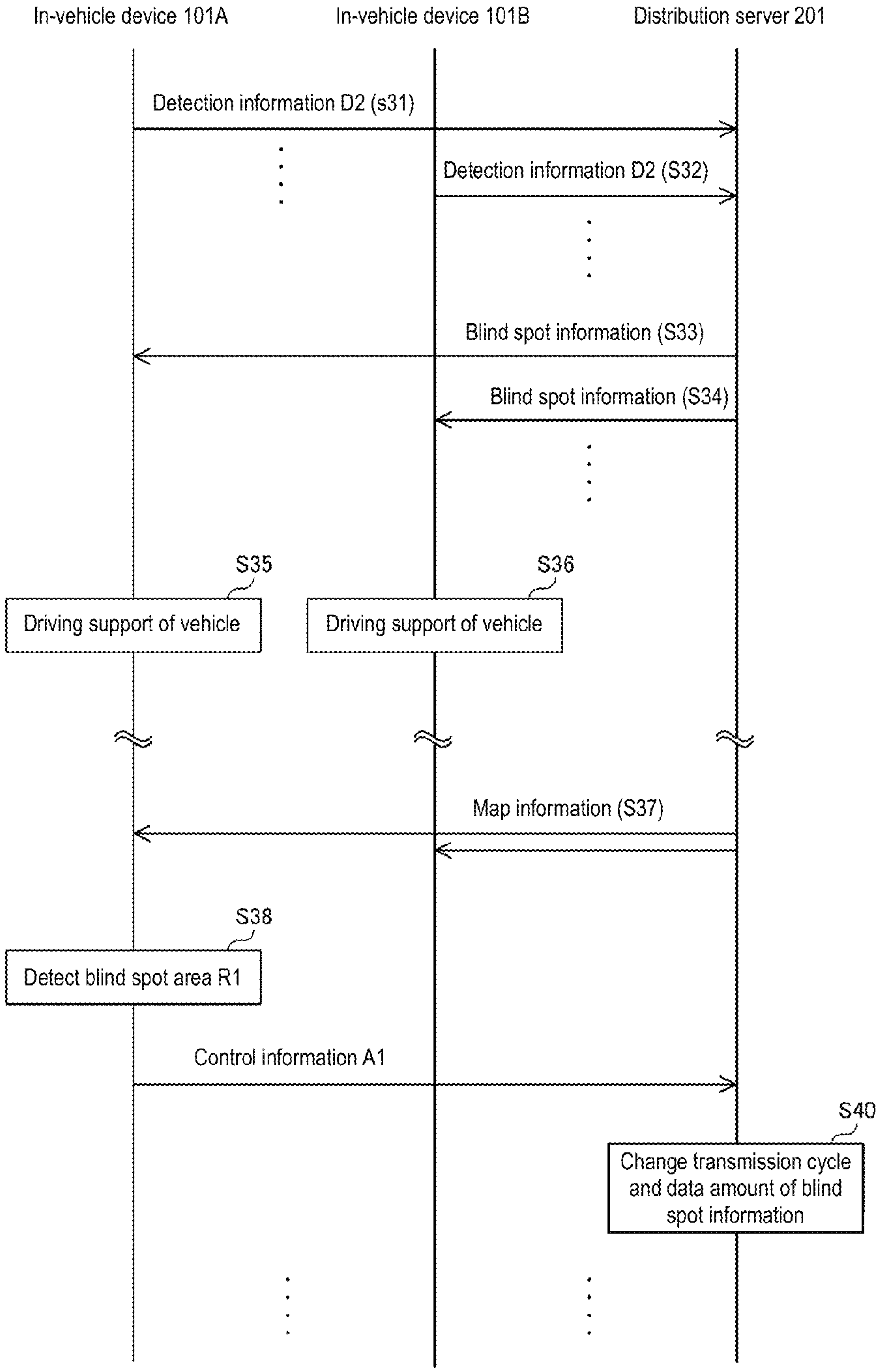
FIG. 8 depicts one example of a communication sequence in a traffic information distributing system according to an embodiment of the present disclosure.

FIG. 8 depicts one example of a communication sequence in a traffic information distributing system according to an embodiment of the present disclosure. FIG. 8 is a sequence for control example 1 described earlier.

As depicted in FIG. 8, first, while the vehicle 40A is located in the target area Rt, the in-vehicle device 101A transmits the detection information D2 via the wireless base station 20 to the distribution server 201 at timing in keeping with the transmission cycle Cs (step S31).

Likewise, while the vehicle 40B is located in the target area Rt, the in-vehicle device 101B transmits the detection information D2 via the wireless base station 20 to the distribution server 201 at timing according to the transmission cycle Cs (step S32).

Next, the distribution server 201 generates blind spot information addressed to the in-vehicle device 101A at generation timing according to the transmission cycle Cb and transmits the generated blind spot information via the wireless base station 20 to the in-vehicle device 101A (step S33).

The distribution server 201 also generates blind spot information addressed to the in-vehicle device 101B at generation timing according to the transmission cycle Cb and transmits the generated blind spot information via the wireless base station 20 to the in-vehicle device 101B (step S34).

After this, the in-vehicle device 101A provides driving support for the vehicle 40A based on the blind spot information received via the wireless base station 20 from the distribution server 201 (step S35).

The in-vehicle device 101B also provides driving support for the vehicle 40B based on the blind spot information received via the wireless base station 20 from the distribution server 201 (step S36).

Next, the distribution server 201 generates map information and transmits the generated map information via the wireless base station 20 to the in-vehicle devices 101A and 101B (step S37).

After this, the in-vehicle device 101A detects the blind spot area R1 of the in-vehicle sensor mounted on the vehicle 40A based on the map information received from the distribution server 201 and the sensor information (step S38).

Next, if the in-vehicle device 101A has determined that there is no possibility of the vehicle 40A colliding with the vehicles 40C and 41D and that there is a following vehicle within a predetermined range from the position of the vehicle 40A, the in-vehicle device 101A transmits the control information A1 via the wireless base station 20 to the distribution server 201 (step S39).

After this, the distribution server 201 changes the length Tb1 of the current transmission cycle Cb for transmitting the blind spot information to the in-vehicle device 101A to the length Tb2 in keeping with the control information A1 received via the wireless base station 20 from the in-vehicle device 101A. In accordance with the control information A1, the distribution server 201 changes the size of the grid areas in the blind spot information to be created from X meters square to Y meters square, which is larger than X meters square, to reduce the number of grid areas and thereby reduce the data amount of the blind spot information to be transmitted to the in-vehicle device 101A (step S40).

Figure 9:
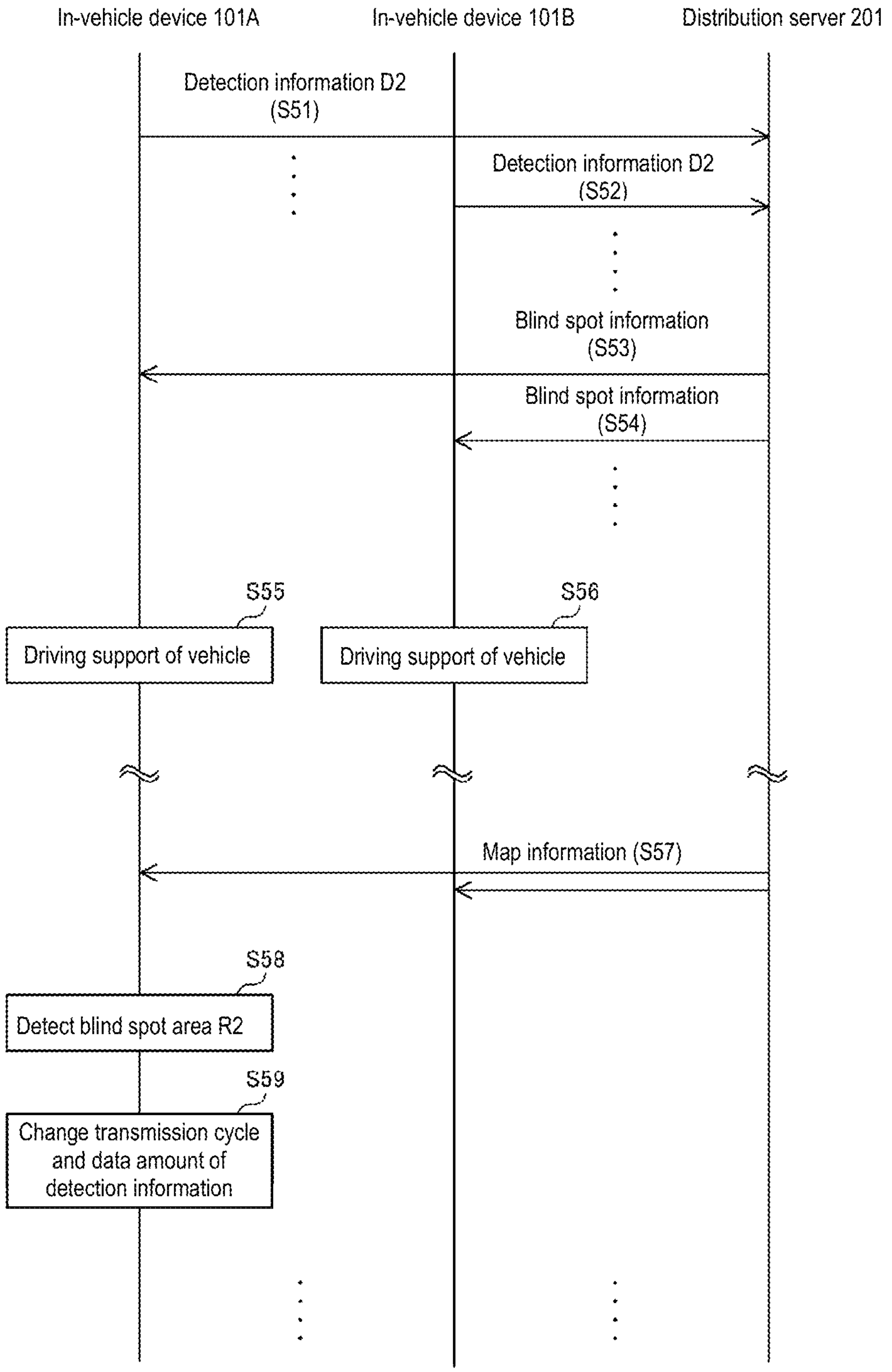
FIG. 9 depicts another example of a communication sequence in a traffic information distributing system according to an embodiment of the present disclosure.

FIG. 9 depicts another example of a communication sequence in a traffic information distributing system according to an embodiment of the present disclosure. FIG. 9 is a sequence for control example 2 described earlier.

As depicted in FIG. 9, the in-vehicle devices 101A and 101B and the distribution server 201 perform the same processes as those in steps S31 to S37 in FIG. 8 as the processes in steps S51 to S57.

Next, the in-vehicle device 101A detects a blind spot area R2 of the in-vehicle sensor mounted on the vehicle 40B based on the map information received from the distribution server 201 (step S58).

After this, if the in-vehicle device 101A has determined that there is no possibility of the vehicle 40B colliding with the vehicle 41E and that there is a following vehicle within a predetermined range from the position of the vehicle 40B, the in-vehicle device 101A changes the length Ts1 of the current transmission cycle Cs of the detection information D2 to the length Ts2 and changes the data amount of the detection information D2 to be generated to L bits (step S59).

Note that although the communication control unit 13 in an in-vehicle device 101 according to the embodiment of the present disclosure is configured to perform control example 1 and control example 2 to control communication by the communication unit 11 with the distribution server 201, the present disclosure is not limited to this. The communication control unit 13 may be configured to not perform either one of control example 1 and control example 2. Also, instead of control example 1 and control example 2, or in addition to control example 1 and control example 2, the communication control unit 13 may be configured to control the transmission cycle of the map information by the distribution server 201.

Although the communication control unit 13 in the in-vehicle device 101 according to an embodiment of the present disclosure is configured to control the transmission cycle Cb and the data amount of the blind spot information transmitted by the distribution server 201 in control example 1, the present disclosure is not limited to this. In control example 1, the communication control unit 13 may be configured to not control either the transmission cycle Cb or the data amount of the blind spot information transmitted by the distribution server 201. In addition, in control example 1, the communication control unit 13 may be configured to control whether the distribution server 201 transmits image data representing an image of the target area Rt in place of or in addition to the transmission cycle Cb and the data amount of the blind spot information transmitted by the distribution server 201.

Also, although the communication control unit 13 in the in-vehicle device 101A according to an embodiment of the present disclosure is configured to not generate the control information A1 or A2 and not output such information to the communication unit 11 in control example 1 when it has been determined that there is a possibility of the vehicle 40A colliding with at least one of the vehicles 40C and 41D, the present disclosure is not limited to this. The communication control unit 13 may be configured so that when it has been determined in control example 1 that there is the possibility of the vehicle 40A colliding with at least one of the vehicles 40C and 41D, the communication control unit 13 generates control information for shortening the length of the transmission cycle Cb of the blind spot information by the distribution server 201 compared to the length Tb1 in the initial state and increasing the data amount of the blind spot information transmitted by the distribution server 201 compared to the data amount in the initial state, and transmits the generated control information via the communication unit 11 and the wireless base station 20 to the distribution server 201.

Although the communication control unit 13 in the in-vehicle device 101 according to the embodiment of the present disclosure is configured to control the transmission cycle Cs and the data amount of the detection information D2 transmitted by the communication unit 11 in control example 2, the present disclosure is not limited to this. The communication control unit 13 may also be configured to not control either the transmission cycle Cs or the data amount of the detection information D2 transmitted by the communication unit 11 in control example 2. In addition, in control example 2, the communication control unit 13 may be configured to control whether the communication unit 11 transmits image data to the distribution server 201, in place of or in addition to the transmission cycle Cs and the data amount of the detection information D2 transmitted by the communication unit 11.

Also, although the communication control unit 13 in the in-vehicle device 101A according to the embodiment of the present disclosure is configured to not generate the control information B1 or B2 and not output such information to the communication unit 11 in control example 2 when it has been determined that there is the possibility of the vehicle 40B colliding with the vehicle 41E, the present embodiment is not limited to this. The communication control unit 13 may be configured so that when it has been determined in control example 2 that there is the possibility of the vehicle 40B colliding with the vehicle 41E, the communication control unit 13 generates control information for shortening the length of the transmission cycle Cs of the detection information D2 by the communication unit 11 compared to the length Ts1 in the initial state and increasing the data amount of the detection information D2 transmitted by the communication unit 11 compared to the data amount in the initial state and outputs the generated control information to the communication unit 11.

Although the communication control unit 13 in the in-vehicle device 101A according to an embodiment of the present disclosure is configured to control the transmission cycle Cb and the data amount of the blind spot information to be transmitted by the distribution server 201 also based on the number of following vehicles within a predetermined range from the position of the vehicle 40A, the present disclosure is not limited to this. The communication control unit 13 may be configured to control the transmission cycle Cb and the data amount of the blind spot information to be transmitted by the distribution server 201 without taking into account the number of following vehicles within a predetermined range from the position of the vehicle 40A.

Also, although the communication control unit 13 in the in-vehicle device 101A according to the embodiment of the present disclosure is configured to control the transmission cycle Cs and the data amount of the detection information D2 transmitted by the communication unit 11 also based on the number of following vehicles within a predetermined range from the position of the vehicle 40B, the present disclosure is not limited to this. The communication control unit 13 may be configured to control the transmission cycle Cs and the data amount of the detection information D2 transmitted by the communication unit 11 without considering the number of following vehicles within a predetermined range from the position of the vehicle 40B.

Also, although the communication control unit 13 in the in-vehicle device 101A according to the embodiment of the present disclosure is configured to control the amount of data of the blind spot area by controlling the size of the grid areas in the blind spot information transmitted by the distribution server 201, the present disclosure is not limited to this. The communication control unit 13 may be configured to not control the size of the grid areas and as another example control the amount of data for the blind spot area by controlling the amount of information per grid area.

All features of the embodiments disclosed here are exemplary and should not be regarded as limitations on the present disclosure. The scope of the present invention is indicated by the range of the patent claims, not the description given above, and is intended to include all changes within the meaning and scope of the patent claims and their equivalents.

Each process (function) in the embodiment described above is realized by a processing circuit (or "circuitry") including one or a plurality of processors. The processing circuit mentioned above may be configured as an integrated circuit or the like where, in addition to the one or plurality of processors described above, one or a plurality of memories, various analog circuits, and various digital circuits are combined. The one or plurality of memories mentioned above store a program (instructions) that cause the one or plurality of processors to execute the respective processes described above. The one or plurality of processors may execute each of the above processes according to a program read from the one or plurality of memories or may execute the respective processes described above according to logic circuits designed in advance to execute the respective processes described above. The processors mentioned above may be any of a variety of processors that are suited to controlling a computer, such as a CPU (Central Processing Unit), a GPU (Graphics Processing Unit), a DSP (Digital Signal Processor), an FPGA (Field Programmable Gate Array), and an ASIC (Application Specific Integrated Circuit). Note that the plurality of processors described above that are physically separated may cooperate with each other to execute the processes described above. As one example, processors installed in a plurality of physically separated computers may cooperate with each other via a network such as a LAN (Local Area Network), a WAN (Wide Area Network), or the Internet to execute the processes described above. The program described above may be installed into the memory described above from an external server device or the like via the network, or may be distributed having been stored on a recording medium such as a CD-ROM (Compact Disc Read Only Memory), a DVD-ROM (Digital Versatile Disk Read Only Memory), or a semiconductor memory, and may be installed into the memory from such recording medium.

The above description also includes the features given in the following appendices.

Appendix 1

An in-vehicle device comprising: a communication unit configured to receive map information, which includes information on a moving object in a target area, from a management device; a detection unit configured to detect, based on the map information received by the communication unit and information indicating a detection range of an in-vehicle sensor, a blind spot area of the in-vehicle sensor in the target area; and a communication control unit configured to control communication with the management device by the communication unit, based on a predicted content relating to movement of the moving object in the blind spot area detected by the detection unit and a predicted content relating to movement of a vehicle in which the in-vehicle sensor is mounted, wherein the communication control unit determines, based on the predicted content relating to the movement of the moving object in the blind spot area and the predicted content relating to the movement of the vehicle in which the in-vehicle sensor is mounted, a possibility of the moving object in the blind spot area and the vehicle in which the in-vehicle sensor is mounted colliding and controls the communication with the management device by the communication unit based on a determination result.

Appendix 2

An in-vehicle device comprising a processing circuit, wherein the processing circuit receives map information, which includes information on a moving object in a target area, from a management device, detects, based on the received map information and information indicating a detection range of an in-vehicle sensor mounted in a vehicle, a blind spot area of the in-vehicle sensor in the target area, controls communication with the management device based on a predicted content relating to movement of the moving object in the detected blind spot area and a predicted content relating to movement of the vehicle.

The invention claimed is:

1. An in-vehicle device comprising:

a communication circuit configured to receive map information, which includes information on a moving object in a target area, from a management device;

a detection circuit configured to detect, based on the map information received by the communication circuit and information indicating a detection range of an in-vehicle sensor mounted in a vehicle, a blind spot area of the in-vehicle sensor in the target area; and a communication control circuit configured to control communication with the management device by the communication circuit, based on a predicted content relating to movement of the moving object in the blind spot area detected by the detection circuit and a predicted content relating to movement of the vehicle, wherein the communication is data transmitted between the management device and the in-vehicle device, and the communication control circuit controls the communication by adjusting at least one of a transmission cycle and an amount of data of the blind spot information transmitted by the management device.

2. The in-vehicle device according to claim 1, wherein the detection circuit detects a first blind spot area, which is a blind spot area of the in-vehicle sensor mounted in a host vehicle, which is the vehicle in which the in-vehicle device is mounted, the communication circuit receives blind spot information, which includes information on the moving object in the first blind spot area, from the management device, and the communication control circuit controls at least one of the transmission cycle and the data amount of the blind spot information transmitted by the management device, based on a predicted content relating to movement of the moving object in the first blind spot area and a predicted content relating to movement of the host vehicle.

3. The in-vehicle device according to claim 2, wherein the communication circuit receives the blind spot information, which indicates a state of each of a plurality of grid areas produced by dividing at least part of the target area into a plurality of lattice-like grid areas and includes information on the moving object in the first blind spot area, from the management device, and the communication control circuit controls a data amount of the blind spot information by controlling, based on a predicted content relating to movement of the moving object in the first blind spot area and a predicted content relating to movement of the host vehicle, a size of the grid areas in the blind spot information transmitted by the management device.

4. The in-vehicle device according to claim 2, wherein the communication control circuit controls at least one of the transmission cycle and the data amount of the blind spot information transmitted by the management device based also on the number of following vehicles within a predetermined range from a position of the host vehicle.

5. The in-vehicle device according to claim 1, wherein the detection circuit detects a second blind spot area, which is the blind spot area of the in-vehicle sensor mounted in another vehicle aside from a host vehicle, which is the vehicle in which the in-vehicle device is mounted, the communication circuit transmits detection information, which indicates a detection result of the in-vehicle sensor mounted on the host vehicle, to the management device, and the communication control circuit controls at least one of the transmission cycle and the data amount of the detection information transmitted by the communication circuit based on a predicted content relating to movement of the moving object in the second blind spot area and a predicted content relating to movement of the other vehicle.

6. The in-vehicle device according to claim 5, wherein the communication control circuit controls at least one of the transmission cycle and the data amount of the detection information transmitted by the communication circuit, based also on the number of following vehicles within a predetermined range from the position of the other vehicle.

7. The in-vehicle device according to claim 2, wherein the detection circuit detects a second blind spot area, which is the blind spot area of the in-vehicle sensor mounted in another vehicle aside from a host vehicle, which is the vehicle in which the in-vehicle device is mounted, the communication circuit transmits detection information, which indicates a detection result of the in-vehicle sensor mounted on the host vehicle, to the management device, and the communication control circuit controls at least one of the transmission cycle and the data amount of the detection information transmitted by the communication circuit based on a predicted content relating to movement of the moving object in the second blind spot area and a predicted content relating to movement of the other vehicle.

8. The in-vehicle device according to claim 3, wherein the detection circuit detects a second blind spot area, which is the blind spot area of the in-vehicle sensor mounted in another vehicle aside from a host vehicle, which is the vehicle in which the in-vehicle device is mounted, the communication circuit transmits detection information, which indicates a detection result of the in-vehicle sensor mounted on the host vehicle, to the management device, and the communication control circuit controls at least one of the transmission cycle and the data amount of the detection information transmitted by the communication circuit based on a predicted content relating to movement of the moving object in the second blind spot area and a predicted content relating to movement of the other vehicle.

9. The in-vehicle device according to claim 4, wherein the detection circuit detects a second blind spot area, which is the blind spot area of the in-vehicle sensor mounted in another vehicle aside from a host vehicle, which is the vehicle in which the in-vehicle device is mounted, the communication circuit transmits detection information, which indicates a detection result of the in-vehicle sensor mounted on the host vehicle, to the management device, and the communication control circuit controls at least one of the transmission cycle and the data amount of the detection information transmitted by the communication circuit based on a predicted content relating to movement of the moving object in the second blind spot area and a predicted content relating to movement of the other vehicle.

10. The in-vehicle device according to claim 2, wherein the detection circuit detects a second blind spot area, which is the blind spot area of the in-vehicle sensor mounted in another vehicle aside from a host vehicle, which is the vehicle in which the in-vehicle device is mounted, the communication circuit transmits detection information, which indicates a detection result of the in-vehicle sensor mounted on the host vehicle, to the management device, and the communication control circuit controls at least one of the transmission cycle and the data amount of the detection information transmitted by the communication circuit based on a predicted content relating to movement of the moving object in the second blind spot area and a predicted content relating to movement of the other vehicle.

11. The in-vehicle device according to claim 3, wherein the detection circuit detects a second blind spot area, which is the blind spot area of the in-vehicle sensor mounted in another vehicle aside from a host vehicle, which is the vehicle in which the in-vehicle device is mounted, the communication circuit transmits detection information, which indicates a detection result of the in-vehicle sensor mounted on the host vehicle, to the management device, and the communication control circuit controls at least one of the transmission cycle and the data amount of the detection information transmitted by the communication circuit based on a predicted content relating to movement of the moving object in the second blind spot area and a predicted content relating to movement of the other vehicle.

12. The in-vehicle device according to claim 4, wherein the detection circuit detects a second blind spot area, which is the blind spot area of the in-vehicle sensor mounted in another vehicle aside from a host vehicle, which is the vehicle in which the in-vehicle device is mounted, the communication circuit transmits detection information, which indicates a detection result of the in-vehicle sensor mounted on the host vehicle, to the management device, and the communication control circuit controls at least one of the transmission cycle and the data amount of the detection information transmitted by the communication circuit based on a predicted content relating to movement of the moving object in the second blind spot area and a predicted content relating to movement of the other vehicle.

13. A communication method for an in-vehicle device comprising:

a step of receiving map information, which includes information on a moving object in a target area, from a management device;

a step of detecting, based on the received map information and information indicating a detection range of an in-vehicle sensor mounted in a vehicle, a blind spot area of the in-vehicle sensor in the target area; and a step of controlling communication with the management device, based on a predicted content relating to movement of the moving object in the detected blind spot area and a predicted content relating to movement of the vehicle, wherein the communication is data transmitted between the management device and the in-vehicle device, and the communication control circuit controls the communication by adjusting at least one of a transmission cycle and an amount of data of the blind spot information transmitted by the management device.

14. A computer communication program comprising a non-transitory, machine-readable medium storing instructions, which when executed by at least one programmable processor to perform operations comprising:

receiving, at the at least one programmable processor, map information, which includes information on a moving object in a target area, from a management device;

detecting, based on the map information received and information indicating a detection range of an in-vehicle sensor mounted in a vehicle, a blind spot area of the in-vehicle sensor in the target area; and a controlling communication with the management device by the communication circuit, based on a predicted content relating to movement of the moving object in the blind spot area detected by the detection circuit and a predicted content relating to movement of the vehicle, wherein the communication is data transmitted between the management device and the in-vehicle device, and the communication control circuit controls the communication by adjusting at least one of a transmission cycle and an amount of data of the blind spot information transmitted by the management device.

* * * * *